United States Patent
Nayak et al.

(10) Patent No.: US 11,108,103 B2
(45) Date of Patent: Aug. 31, 2021

(54) THERMAL MANAGEMENT SYSTEM INCLUDING PHASE-CHANGE MATERIALS HAVING DIFFERENT PHASE-CHANGE TEMPERATURES FOR AN ON-VEHICLE BATTERY

(71) Applicant: GM Global Technology Operations LLC, Detroit, MI (US)

(72) Inventors: Raviraj U. Nayak, Rochester Hills, MI (US); Derek W. Fultz, Royal Oak, MI (US); Robert D. Drexler, Madison Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 134 days.

(21) Appl. No.: 16/380,262

(22) Filed: Apr. 10, 2019

(65) Prior Publication Data

US 2020/0328487 A1    Oct. 15, 2020

(51) Int. Cl.
*H01M 10/6569* (2014.01)
*H01M 10/0525* (2010.01)
*H01M 10/613* (2014.01)
*H01M 10/625* (2014.01)
*H01M 10/653* (2014.01)
(Continued)

(52) U.S. Cl.
CPC ... *H01M 10/6569* (2015.04); *H01M 10/0525* (2013.01); *H01M 10/613* (2015.04); *H01M 10/625* (2015.04); *H01M 10/647* (2015.04); *H01M 10/653* (2015.04); *H01M 10/663* (2015.04); *H01M 50/20* (2021.01);
(Continued)

(58) Field of Classification Search
CPC .......... H01M 10/6569; H01M 10/613; H01M 10/625; H01M 10/647; H01M 10/653; H01M 10/663; H01M 2/1077; H01M 2/1083
USPC ....................................................... 429/120
See application file for complete search history.

(56) References Cited

U.S. PATENT DOCUMENTS

2010/0297483 A1\* 11/2010 Kawai ................. H01M 10/643
429/62
2016/0264018 A1    9/2016 Choufany et al.
2019/0051955 A1    2/2019 Lebreux et al.

FOREIGN PATENT DOCUMENTS

CN      205863347 U  *  1/2017
CN      109148769 A  *  1/2019
(Continued)

*Primary Examiner* — Sean P Cullen
(74) *Attorney, Agent, or Firm* — Quinn IP Law

(57) ABSTRACT

A thermal management system for an on-vehicle battery includes a battery, a first thermal element, a second thermal element, a battery mounting bracket, and a vehicle body structural element. The battery mounting bracket includes a first portion attached to the vehicle body structural element, and a second portion attached to the first thermal element. The first thermal element is attached to the first end portion of the battery, and the second thermal element is attached to at least one of the second end portion, the first and second side portions, the top portion or the bottom portion of the battery. The first thermal element is composed from a first phase-change material having a first phase-change temperature and the second thermal element is composed from a second phase-change material having a second phase-change temperature, wherein the first phase-change temperature is greater than the second phase-change temperature.

18 Claims, 2 Drawing Sheets

(51) Int. Cl.
*H01M 10/663* (2014.01)
*H01M 10/647* (2014.01)
*H01M 50/20* (2021.01)
*B60R 16/033* (2006.01)

(52) U.S. Cl.
CPC ......... *B60R 16/033* (2013.01); *B60Y 2306/05* (2013.01); *B60Y 2400/112* (2013.01); *H01M 2220/20* (2013.01)

(56) References Cited

FOREIGN PATENT DOCUMENTS

| | | | | |
|---|---|---|---|---|
| WO | WO-2011072988 A1 * | 6/2011 | ......... | B60H 1/00492 |
| WO | WO-2018065554 A1 * | 4/2018 | ............ | H01M 50/24 |
| WO | WO-2018113450 A1 * | 6/2018 | .......... | H01M 10/613 |

* cited by examiner

THERMAL MANAGEMENT SYSTEM INCLUDING PHASE-CHANGE MATERIALS HAVING DIFFERENT PHASE-CHANGE TEMPERATURES FOR AN ON-VEHICLE BATTERY

INTRODUCTION

DC power sources, such as high-voltage batteries, are electrochemical devices that may be employed on vehicles and elsewhere to store and release electric power that may be converted by an electric machine to generate tractive effort for vehicle propulsion. Heat may be generated by the processes of converting electric power to chemical potential energy, i.e., battery charging, and converting chemical potential energy to electric power, i.e., battery discharging.

Operating a DC power source outside of a desired temperature range may reduce battery service life, and is preferably avoided. By way of example, a DC power source may employ lithium-ion technology to store electric power as chemical potential energy. Lithium-ion technology has an optimal temperature range to maximize service life of the battery, which may be in a range between 20 C and 35 C. Operation of the battery outside of this range may accelerate aging of the battery, reduce the service life of the battery, and/or reduce the energy storage capacity thereof.

Control systems may limit battery usage at temperatures above an upper threshold temperature and at temperatures below a lower threshold temperature. This may include limiting battery usage under certain vehicle operating conditions to control heat generation. An overshoot of a maximum temperature limit may require a limitation of the power demanded of the battery so as to reduce the thermal power generated, to permit the battery temperature to return to the optimal temperature range. Limitation of a battery power demand is called "derating" the battery, which increases in likelihood at higher ambient temperatures and at increased power demands from the battery. Battery power derating reduces vehicle performance, in terms of propulsion torque provided by an electric machine and/or driving range of the vehicle when operating in an electric vehicle mode.

One known system for managing battery temperatures includes circulating engine coolant in proximity to the battery to effect heat transfer. Another known system includes employing a fan to remove heat via convective heat transfer. Such systems increase on-vehicle part counts, add weight to the vehicle in the form of additional coolant and components for the coolant circuit or fan, consume packaging space underhood and a vehicle cabin area, increase on-vehicle noise and vibration, and consume energy to operate the respective devices. As such, there is a need for a heat transfer system for batteries that addresses the aforementioned issues.

SUMMARY

A thermal management system for an on-vehicle battery is described, and includes a battery, a first thermal element, a second thermal element, a battery mounting bracket, and a vehicle body structural element. As described herein, the battery may be arranged as a rectangular prism including first and second side portions, first and second end portions, a top portion and a bottom portion. The battery mounting bracket includes a first portion and a second portion, wherein the first portion is attached to the vehicle body structural element and wherein the second portion is attached to the first thermal element. The first thermal element is attached to the first end portion of the battery, and the second thermal element is attached to at least one of the second end portion, the first and second side portions, the top portion or the bottom portion of the battery. The first thermal element is composed from a first phase-change material having a first phase-change temperature and the second thermal element is composed from a second phase-change material having a second phase-change temperature, wherein the first phase-change temperature is greater than the second phase-change temperature.

An aspect of the disclosure includes the first thermal element being attached to the first end portion of the battery, including the first thermal element being arranged as a prismatic device including a first face and a second face, wherein the first face is thermally coupled to the first end portion of the battery.

Another aspect of the disclosure includes the second face of the first thermal element being thermally coupled to the second portion of the battery mounting bracket.

Another aspect of the disclosure includes the battery mounting bracket being fabricated from thermally conductive material.

Another aspect of the disclosure includes a first conductive heat transfer path being defined between the battery, the first thermal element, the battery mounting bracket and the vehicle body structural element.

Another aspect of the disclosure includes the battery being composed as a plurality of stacked prismatic cells, wherein each of the stacked prismatic cells includes a first end and a second end, wherein the first ends of the stacked prismatic cells are disposed at the first end portion of the battery, and wherein the second ends of the stacked prismatic cells are disposed at the second end portion of the battery.

Another aspect of the disclosure includes the second thermal element being attached to at least one of the second end portion, the first and second side portions, the top portion or the bottom portion of the battery includes the second thermal element being arranged as a prismatic device including a first face and a second face, wherein the first face is thermally coupled to the one of the second end portion, the first and second side portions, the top portion or the bottom portion of the battery.

Another aspect of the disclosure includes the second face of the second thermal element being thermally coupled to a heat sink.

Another aspect of the disclosure includes the heat sink being a plate having a plurality of finned elements projecting from a surface thereof.

Another aspect of the disclosure includes a second conductive heat transfer path being defined between the battery, the second thermal element, the heat sink and ambient air.

Another aspect of the disclosure includes the battery, the second thermal element and the heat sink being disposed in a cabin area of the vehicle, and wherein the ambient air includes ambient air in the cabin area of the vehicle.

Another aspect of the disclosure includes the battery including positive and negative battery terminals, wherein neither the first element nor the second element is disposed proximal to the positive and negative battery terminals.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

Figure 1:
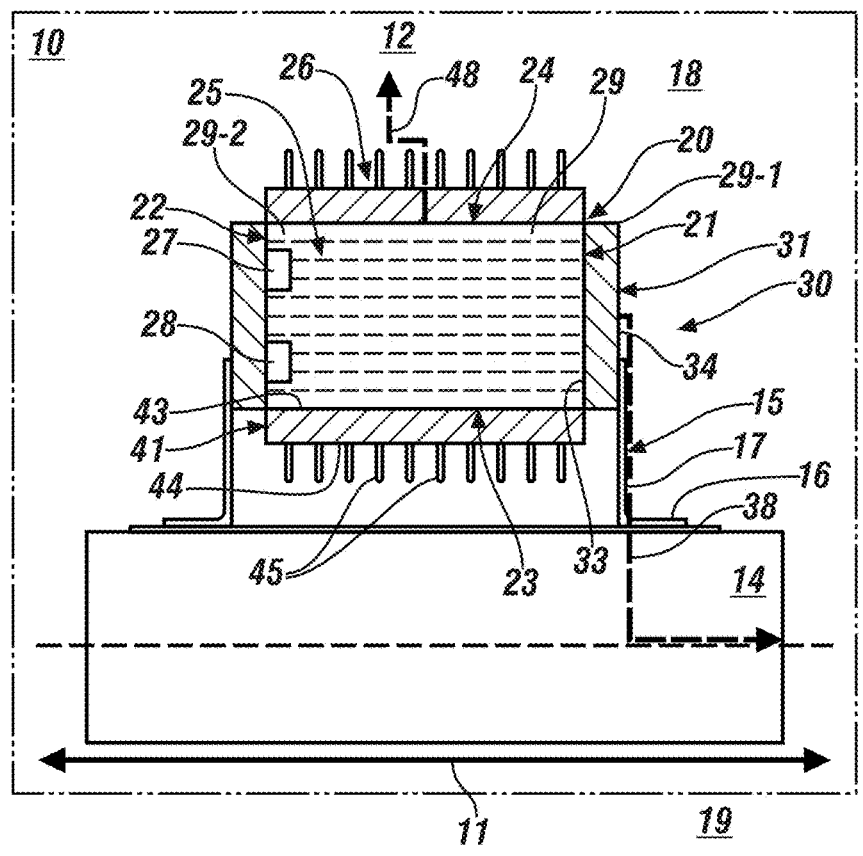
FIG. 1 schematically shows a top-view of an embodiment of a portion of a cabin area of a vehicle, including a body structural element and a DC power source, in accordance with the disclosure.

FIG. 1 schematically shows a top-view portion of a vehicle 10, which includes a cabin area 12, a body structural element 14, and a DC power source (battery) 20. The battery 20 may be employed to supply DC electric power to a vehicle, including being employed to supply electric power to an electric machine that provides mechanical power for tractive effort. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. Alternatively, the battery 20 may be employed in a suitable device that employs electric power to accomplish a task, including, but not limited to consumer electronic devices such as cellular phones, portable computing devices, etc. The terms "DC power source", "battery", "battery cell" and "cell" are employed interchangeably throughout the specification. In one embodiment, the battery 20 is configured with silicon electrodes that effect an electrical charge by migration of lithium.

The battery 20 may be arranged as a rectangular prism including first and second end portions 21, 22, respectively, first and second side portions 23, 24, respectively, a top portion 25, and a bottom portion 26. Battery terminals, including a positive terminal 27 and a negative terminal 28, are disposed on the top portion 25 in one embodiment and as shown.

The battery 20 is composed as a plurality of stacked prismatic cells 29 that are contained within the structure of the rectangular prism. In one embodiment, and as shown with reference to FIG. 1, each of the stacked prismatic cells 29 includes a first end 29-1 and a second end 29-2, with the first ends 29-1 of the stacked prismatic cells 29 being disposed at the first end portion 21 of the battery 20, and the second ends 29-2 of the stacked prismatic cells 29 being disposed at the second end portion 22 of the battery 20. In one embodiment, and as shown, the stacked prismatic cells 29 are arranged with longitudinal axes that are in parallel with a longitudinal axis 11 of the vehicle 10.

The battery 20 is disposed in the cabin area 12 of the vehicle 10 in one embodiment, and is fixedly attached to the body structural element 14 via one or a plurality of mounting brackets 15, wherein each of the mounting brackets 15 includes a first portion 16 that is attached to the body structural element 14 and a second portion 17 that is fixedly attached to the battery 20. The body structural element 14 may be a portion of a floor panel that includes a tunnel area. The mounting bracket(s) 15 is designed to provide structural support for the battery 20 to securely attach it to the body structural element 14. The mounting bracket(s) 15 is fabricated from a material having a high heat transfer coefficient, e.g., aluminum or steel, and is also designed to effect conductive heat transfer between the battery 20 and the body structural element 14.

A thermal management system 30 for heat transfer related to the battery 20 includes one or a plurality of first thermal elements 31 and one or a plurality of second thermal elements 41. Each of the first thermal elements 31 is interposed between one of the battery mounting brackets 15 and one or more of the first and second side portions 23, 24, the first and second end portions 21, 22, the top portion 25 and the bottom portion 26 of the battery 20. FIG. 1 shows one non-limiting embodiment, wherein the first thermal elements 31 are interposed between the battery mounting brackets 15 and the first and second end portions 21, 22 of the battery 20.

Each of the first thermal elements 31 is arranged as a prismatic device having a first face 33 and an opposed second face 34, wherein the first face 33 is in physical contact with and coextensive with the respective first end portion 21 or second end portion 22 of the battery 20, and the second face 34 is in physical contact with the second portion 17 of the mounting bracket 15. This arrangement facilitates conductive heat transfer between the body element 14 and one of the first and second end portions 21, 22 of the battery 20. As such, the first thermal elements 31 are arranged to manage heat transfer between the battery mounting brackets 15 and the first and second end portions 21, 22 of the battery 20. Alternatively, the first thermal elements 31 may be arranged so the respective first face 33 is in physical contact with and coextensive with the respective one or both of the first and second side portions 23, 24, in order to facilitate conductive heat transfer between the body element 14 and one or both of the first and second side portions 23, 24 of the battery 20. Also depicted are first and second heat transfer paths 38, 48, respectively, for the thermal management system 30 that is disposed in the cabin 12 of the vehicle 10. The first heat transfer path 38 includes the battery 20 that transfers heat to the first thermal element 31, which transfers heat to the vehicle body 14 via the mounting bracket 15, a portion of which may be in contact with ambient air 19. The second heat transfer path 48 includes the battery 20 that transfers heat to the second thermal element 41, which transfers heat to cabin air 18, which may interacts with ambient air 19 via a heating/ventilation system.

Figure 2:
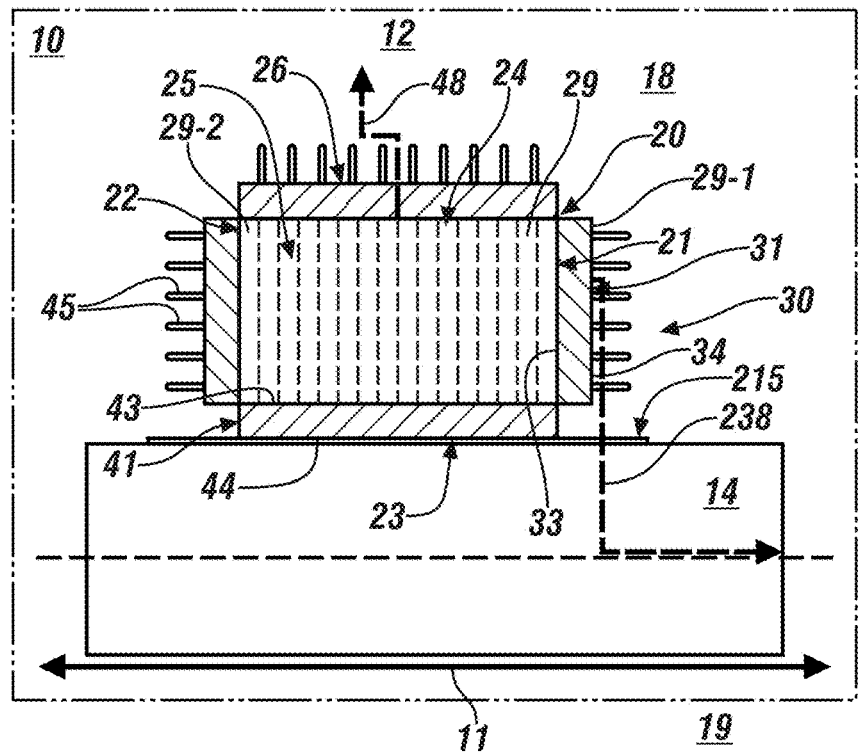
FIG. 2 schematically shows a top-view of another embodiment of a portion of a cabin area of a vehicle, including a body structural element and a DC power source, in accordance with the disclosure.

FIG. 2 schematically shows an embodiment wherein a single one of the first thermal elements 31 is arranged with the first face 33 being in physical contact with and coextensive with the first side portion 23, and with the second face 34 being in contact with a mounting bracket 215 that directly couples to the body element 14, in order to facilitate conductive heat transfer between the body element 14 and the first side portion 23 of the battery 20 via the mounting bracket 215. In this embodiment, the plurality of stacked prismatic cells 29 contained within the structure of the rectangular prism of the battery 20 are arranged with longitudinal axes that are orthogonal to the longitudinal axis 11 of the vehicle 10, with the first ends 29-1 of the stacked prismatic cells 29 being disposed at the first side portion 23 of the battery 20, and the second ends 29-2 of the stacked prismatic cells 29 being disposed at the second side portion 24 of the battery 20. In one embodiment, and as shown, the stacked prismatic cells 29 are arranged with longitudinal axes that are in parallel with a longitudinal axis 11 of the vehicle 10. The first and second heat transfer paths 238, 48, respectively, for the thermal management system 30 that is disposed in the cabin 12 of the vehicle 10 are also depicted. The first heat transfer path 238 includes the battery 20 that transfers heat to the first thermal element 31, which transfers heat via the mounting bracket 215 to the vehicle body 14, a portion of which may be in contact with ambient air 19. The second heat transfer path 48 includes the battery 20 that transfers heat to the second thermal element 41, which transfers heat to cabin air 18, which may interacts with ambient air 19 via a heating/ventilation system.

Referring again to FIG. 1, the second thermal elements 41 are attached to one or more of the remaining sides, ends, top and bottom portions of the battery 20, although not to that portion or side of the battery 20 on which the positive and negative terminals 27, 28 are mounted.

Each of the second thermal elements 41 is arranged as a prismatic device having a first face 43 and an opposed second face 44. The first face 43 is in physical contact with and coextensive with the respective one of the remaining sides, ends, top and bottom portions of the battery 20. The second face 44 is physically and thermally coupled to a heat sink 45, which may include a plurality of heat conduction fins extending outwardly therefrom. This arrangement facilitates heat transfer between the respective one of the remaining sides, ends, top and bottom portions of the battery 20 and ambient air 19 in the cabin 12. As shown with reference to FIG. 1, the second thermal elements 41 are attached to the first and second side portions 23, 24, and the bottom portion 26 of the battery 20 to transfer heat between the battery 20 and ambient air 19 in the cabin 12.

The first thermal element(s) 31 and the second thermal element(s) 41 include latent heat storage devices that are fabricated to include temperature-based phase-change materials. A phase-change material (PCM) is a material having a high heat of fusion that changes phase, i.e., melts or solidifies, at a certain temperature, and is capable of storing and releasing large amounts of heat energy. Heat is absorbed or released when the material changes from solid to liquid and vice versa. One form of a PCM is a solid-liquid PCM, which changes phase between a solid state and a liquid state in response to a temperature change. A solid-liquid PCM behaves like a sensible heat storage material at temperatures below its transition temperature, i.e., its temperature rises as it absorbs heat. However, when a PCM reaches the temperature at which they change phase, i.e., melting temperature, they absorb large amounts of heat at an almost constant temperature. The PCM continues to absorb heat without a significant rise in temperature until all the material is transformed to the liquid phase. When the ambient temperature around a liquid material falls, the PCM solidifies, releasing its stored latent heat. PCMs are available that have a transition temperature in a preferred or required temperature range, e.g., between −5 C and 190 C. A PCM is characterized in terms of its heat of fusion, thermal conductivity, specific heat and density (kg/m3), latent heat (kJ/kg), long term reliability during repeated cycling, and freezing behavior.

Figure 3:
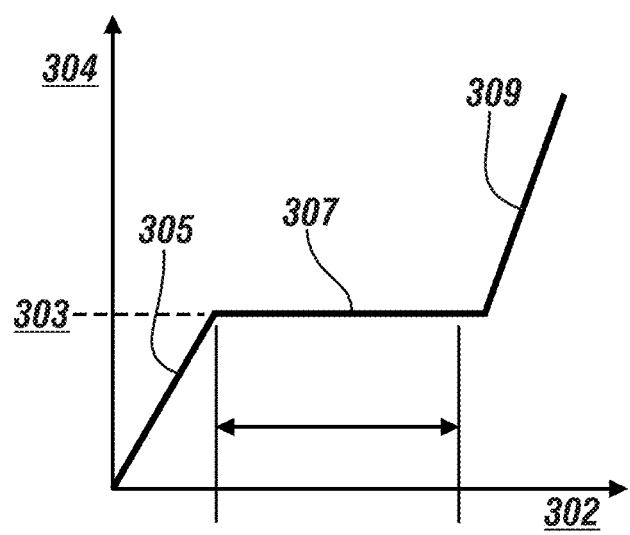
FIG. 3 graphically shows a relationship between heat and temperature for an embodiment of phase-change material in response to heat transfer, in accordance with the disclosure.

FIG. 3 graphically shows a relationship between heat, which is shown on the horizontal axis 302, and temperature, which is shown on the vertical axis 304, for an example phase-change material in response to heat transfer. As indicated, during a first, solid-state phase 305, the temperature of the phase-change material increases as heat is transferred thereto, until reaching the transition temperature, indicated by 303. During the phase transition period, indicated by element 307, the temperature of the phase-change material holds constant even as heat continues to be transferred thereto. When the phase-change material has completely transitioned to liquid phase, the temperature of the phase-change material again increases as heat is transferred thereto, as a second, liquid-state phase 309. This phase change process operates in both directions, i.e., in both a solid-to-liquid transition and a liquid-to-solid transition. The temperature at which the phase transition period 307 occurs is controllable by material selection of the phase-change material.

Referring again to FIG. 1, the first thermal elements 31 are composed from a first phase-change material having a first phase-change temperature, and the second thermal elements 41 are composed from a second phase-change material having a second phase-change temperature, wherein the first phase-change temperature is greater than the second phase-change temperature. In one embodiment, the first thermal elements 31 are composed from a PCM that achieves a first phase-change temperature in the order of magnitude of 43 C, and the second thermal elements 41 are composed from a PCM that achieves a second phase-change temperature in the order of magnitude of 32 C. The temperature range of 32 C-43 C is selected to achieve a stable temperature in a range that is consistent with a temperature range for a battery 20 that is composed of lithium-ion materials.

Figure 4:
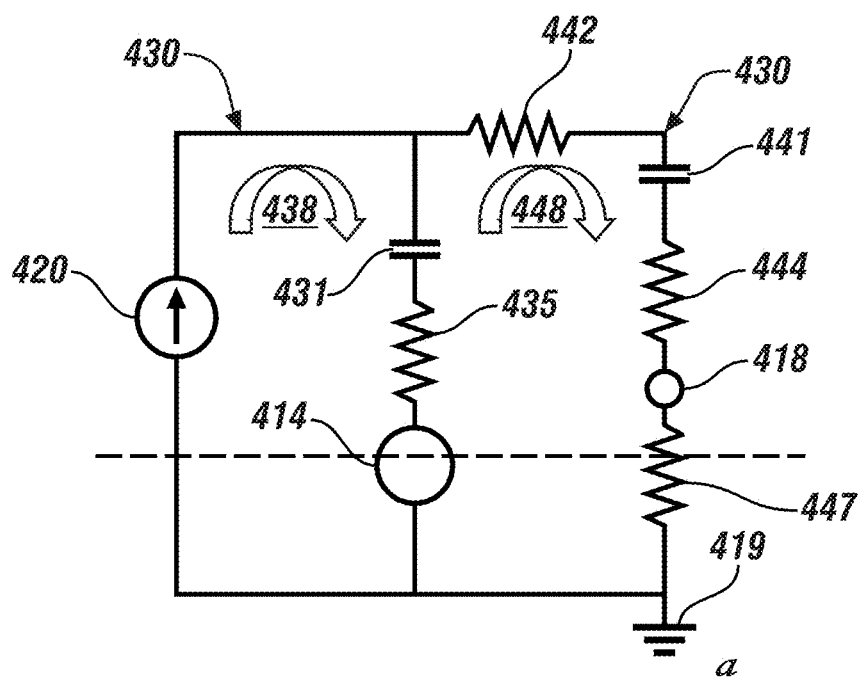
FIG. 4 schematically illustrates first and second heat transfer paths for a thermal management system that is disposed in a cabin of a vehicle, in accordance with the disclosure.

FIG. 4 schematically illustrates first and second heat transfer paths 438, 448, respectively, for a thermal management system 430 that is disposed in a cabin 412 of a vehicle 410, and represents an embodiment of the thermal management system 30 that is described with reference to FIG. 1. Electrical analogs are employed to represent various elements of the thermal management system 430, wherein the electrical analogs are functional equivalents of the various heat sources, heat transfer and resistance paths, heat sinks, etc. A first heat transfer path 438 includes a battery 420 that transfers heat to a first thermal element 431, which transfers heat to a vehicle body 414, a portion of which is in contact with ambient air 419. Resistance to heat transfer is represented by a first resistive element 435. The battery 420 is represented as a heat source, and the first thermal element 431 is represented as a capacitive device.

A second heat transfer path 448 includes the battery 420 that transfers heat to a second thermal element 441, which transfers heat to a cabin air 418, which interacts with ambient air 419. Resistive paths are represented by a second resistive element 442, a third resistive element 444, and a fourth resistive element 447. The second resistive element 442 is associated with resistance to heat transfer from the battery 420 in a direction that is transverse to the cell stack. The third resistive element 444 is associated with resistance to heat transfer from the second thermal element 441 to the cabin air 418. The fourth resistive element 449 is associated with resistance to heat transfer from cabin air 418 to ambient air 419. The concepts provided in FIG. 4 may be reduced to an executable mathematical model that can be employed to determine design parameters in the form of volumetric sizes, masses, areas, etc. for the first and second thermal elements 431, 441 based upon heat loads, heat capacities, etc.

The concepts described herein facilitate a robust directional thermal management using the body 14 as a heat sink when the battery 20 is warmer than the body 14, and using Phase Change Materials (PCM) as a barrier or buffer for heat transfer from the body 14 when the battery 20 is cooler than the body 14. As such, the body 14 can be used as heat sink in winter and at cooler temperatures.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A thermal management system for an on-vehicle battery, comprising:
    the battery, wherein the battery is arranged as a rectangular prism including first and second side portions, first and second end portions, a top portion and a bottom portion;
    a first thermal element;
    a second thermal element;
    a battery mounting bracket; and
    a vehicle body structural element;
    wherein the battery mounting bracket includes a first portion and a second portion, wherein the first portion is attached to the vehicle body structural element and wherein the second portion is attached to the first thermal element;
    wherein the first thermal element is in physical contact with and coextensive with the first end portion of the battery;
    wherein the second thermal element is in physical contact with and coextensive with at least one of the second end portion, the first and second side portions, the top portion or the bottom portion of the battery;
    wherein the first thermal element is composed from a first phase-change material having a first solid-liquid phase-change temperature;
    wherein the second thermal element is composed from a second phase-change material having a second solid-liquid phase-change temperature; and
    wherein the first solid-liquid phase-change temperature is greater than the second solid-liquid phase-change temperature.

2. The thermal management system of claim 1, wherein the battery further comprises positive and negative battery terminals, wherein neither the first thermal element nor the second thermal element is disposed proximal to the positive and negative battery terminals.

3. The thermal management system of claim 1, wherein the second thermal element is arranged as a prismatic device including a first face and a second face; and
    wherein the first face is thermally coupled to the one of the second end portion, the first and second side portions, the top portion or the bottom portion of the battery.

4. The thermal management system of claim 3, wherein the second face of the second thermal element is thermally coupled to a heat sink.

5. The thermal management system of claim 4, wherein the heat sink comprises a plate having a plurality of finned elements projecting from a surface thereof.

6. The thermal management system of claim 4, wherein a second conductive heat transfer path is defined between the battery, the second thermal element, the heat sink and ambient air.

7. The thermal management system of claim 6, wherein the battery, the second thermal element and the heat sink are disposed in a cabin area of the vehicle, and wherein the ambient air comprises ambient air in the cabin area of the vehicle.

8. The thermal management system of claim 1, wherein the first thermal element being in physical contact with and coextensive with the first end portion of the battery comprises:
    the first thermal element being arranged as a prismatic device including a first face and a second face,
    wherein the first face is thermally coupled to the first end portion of the battery.

9. The thermal management system of claim 8, wherein the battery is composed as a plurality of stacked prismatic cells;
    wherein each of the stacked prismatic cells includes a first end and a second end;
    wherein the first ends of the stacked prismatic cells are disposed at the first end portion of the battery; and
    wherein the second ends of the stacked prismatic cells are disposed at the second end portion of the battery.

10. The thermal management system of claim 8, wherein the second face of the first thermal element is thermally coupled to the second portion of the battery mounting bracket.

11. The thermal management system of claim 10, wherein the battery mounting bracket is fabricated from thermally conductive material.

12. The thermal management system of claim 11, wherein a first conductive heat transfer path is defined between the battery, the first thermal element, the battery mounting bracket and the vehicle body structural element.

13. A thermal management system for an on-vehicle battery, comprising:
    a battery attached to a vehicle body structure via a plurality of battery mounting brackets, a plurality of first thermal elements; and a plurality of second thermal elements;

wherein the battery is arranged as a rectangular prism including first and second side portions, first and second end portions, a top portion and a bottom portion;

wherein each of the battery mounting brackets includes a first portion and a second portion, wherein the first portion is in physical contact with the vehicle body structural element and wherein the second portion is in physical contact with and coextensive with one of the first thermal elements;

wherein each of the first thermal elements is interposed between one of the battery mounting brackets and one of the first and second side portions, the first and second end portions, the top portion and the bottom portion of the battery;

wherein the second thermal elements are in physical contact with and coextensive with at least one of the first and second side portions, the first and second end portions, the top portion and the bottom portion of the battery that are not attached to one of the battery mounting brackets;

wherein the first thermal elements are composed from a first phase-change material having a first solid-liquid phase-change temperature;

wherein the second thermal elements are composed from a second phase-change material having a second solid-liquid phase-change temperature; and wherein the first solid-liquid phase-change temperature is greater than the second solid-liquid phase-change temperature.

14. The thermal management system of claim 13, wherein the one of the battery mounting brackets is in physical contact with and coextensive with the bottom portion of the battery via one of the first thermal elements, and wherein at least one of the first and second side portions, the first and second end portions, and the top portion of the battery is in physical contact with and coextensive with one of the second thermal elements.

15. The thermal management system of claim 13, wherein the one of the battery mounting brackets is in physical contact with and coextensive with the first end portion of the battery via one of the first thermal elements, and wherein at least one of the first and second side portions, the top portion and the bottom portion of the battery is in physical contact with and coextensive with one of the second thermal elements.

16. The thermal management system of claim 15, wherein the battery is composed as a plurality of stacked prismatic cells;
  wherein each of the stacked prismatic cells includes a first end and a second end;
  wherein the first ends of the stacked prismatic cells are disposed at the first end portion of the battery; and
  wherein the second ends of the stacked prismatic cells are disposed at the second end portion of the battery.

17. The thermal management system of claim 13, wherein the one of the battery mounting brackets is in physical contact with and coextensive with the first side portion of the battery via one of the first thermal elements, and wherein at least one of the first and second end portions, the top portion and the bottom portion of the battery is in physical contact with and coextensive with one of the second thermal elements.

18. The thermal management system of claim 17, wherein the battery is composed as a plurality of stacked prismatic cells;
  wherein each of the stacked prismatic cells includes a first end and a second end;
  wherein the first ends of the stacked prismatic cells are disposed at the first side portion of the battery; and
  wherein the second ends of the stacked prismatic cells are disposed at the second side portion of the battery.

* * * * *